(12) United States Patent  (10) Patent No.: US 7,103,704 B2
Chatterjee  (45) Date of Patent: Sep. 5, 2006

(54) EXPORTING I2C CONTROLLER INTERFACES FOR I2C SLAVE DEVICES USING IPMI MICRO-CONTROLLER

(75) Inventor: Ranen Chatterjee, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 332 days.

(21) Appl. No.: 10/693,029

(22) Filed: Oct. 24, 2003

(65) Prior Publication Data

US 2005/0091438 A1 Apr. 28, 2005

(51) Int. Cl.
*G06F 13/00* (2006.01)

(52) U.S. Cl. .................. 710/315; 710/313; 710/306

(58) Field of Classification Search .................. None
See application file for complete search history.

(56) References Cited

U.S. PATENT DOCUMENTS

| | | |
|---|---|---|
| 6,542,939 B1 | 4/2003 | Osten |
| 6,614,752 B1* | 9/2003 | Parrish et al. .............. 370/217 |
| 6,681,282 B1 | 1/2004 | Golden |
| 6,711,693 B1 | 3/2004 | Golden |
| 6,845,410 B1 | 1/2005 | Brown |
| 2001/0044841 A1* | 11/2001 | Kosugi et al. .............. 709/223 |
| 2003/0033464 A1* | 2/2003 | Larson et al. .............. 710/302 |
| 2004/0083356 A1 | 4/2004 | Chatterjee et al. |

OTHER PUBLICATIONS

"The Interactive Performance of SLIM: a Stateless, Thin-Client Architecture", Schmidt, et al, *17th ACM Symposium on Operating Systems Principles (SOSP '99)*, published as *Operating Systems Review*, ACM, 34(5): 32-47, Dec. 1999.

* cited by examiner

*Primary Examiner*—Glenn A. Auve
(74) *Attorney, Agent, or Firm*—Meyertons Hood Kivlin Kowert & Goetzel, P.C.; B. Noel Kivlin (57) ABSTRACT

A system and method is provided that allows an Intelligent Platform Management Interface (IPMI) controller (or another micro-controller that is not a dedicated I2C controller) to control various Inter Integrated Circuit (I2C) slave devices having I2C slave drivers without any modification of the I2C slave drivers on the I2C slave devices. The I2C slave devices can be managed without an external and/or a dedicated I2C master controller. In one embodiment, a translation module is provided to an IPMI micro-controller that can represent I2C interface to I2C device drivers. In another embodiment, the translation module can represent an interface for an IPMI controller to I2C device drivers located in one or more I2C devices and/or I2C controllers.

25 Claims, 6 Drawing Sheets

EXPORTING I2C CONTROLLER INTERFACES FOR I2C SLAVE DEVICES USING IPMI MICRO-CONTROLLER

BACKGROUND OF THE INVENTION

1. Field of the Invention

The present invention relates to computer systems and the like, more particularly, it relates to a system and method for managing and accessing computer devices of a computer server system.

2. Description of Related Art

A computer platform can be designed with a variety of implementations/architectures that are either defined within existing standards (for example the PCI Industrial Computer Manufacturers Group, or PICMG, standards), or can be customized architectures. For example, a computer platform can be designed with a Compact Peripheral Component Interconnect (CPCI). The CPCI is a high performance industrial bus based on the standard PCI electrical specification in rugged 3U or 6U Eurocard packaging. CPCI is intended for application in telecommunications, computer telephony, real-time machine control, industrial automation, real-time data acquisition, instrumentation, military systems or any other application requiring high-speed computing, modular and robust packaging design, and long-term manufacturer support. Because of its high speed and bandwidth, the CPCI bus is particularly well suited for many high-speed data communication applications, such as for server applications.

Compared to a standard desktop PCI, a computer system having CPCI supports twice as many PCI slots (typically 8 versus 4) and offers an ideal packaging scheme for industrial applications. A CPCI computer system includes CPCI node cards that are designed for front loading and removal from a card chassis and a plurality of field replaceable units (FRUS)—such as fans, power supplies, etc. The CPCI node cards (or motherboards or front cards) include processing unit(s) for the computer system and are firmly held in position by their connector, card guides on both sides, and a faceplate that solidly screws into the card rack. The CPCI node cards are mounted vertically allowing for natural or forced air convection for cooling. Also, the pin-and-socket connector of the CPCI node card is significantly more reliable and has better shock and vibration characteristics than the card edge connector of the standard PCI node cards.

The CPCI computer system also includes at least one management controller (or micro-controller) for managing and accessing devices on the system. The management controller is coupled with a Central Processing Unit (CPU) of a node card and offloads certain management functions from the CPU of the node card. For example, certain management functions for the temperature, voltage, fans, power supplies, etc. of the system can be offloaded to the management controller. Typically, the management controller can be an Intelligent Platform Management Interface (IPMI) controller and/or an Inter Integrated Circuit (I2C) controller.

The node cards, having IPMI slave drivers, are managed and accessed by a CPU of a node card via the IPMI controller that receives notification of system management events and participates in the overall management infrastructure. The other hardware components (or the FRUs) having I2C slave drivers are managed and accessed by the CPU of the node card using the Inter Integrated Circuit (I2C) controller.

Due to its limited data transfers capabilities, the dedicated I2C controller is limited to applications on hardware components that require infrequent access and a small amount of data transfers. However, because of the low cost, there are advantages in using the I2C protocol and I2C slave drivers to manage and access certain hardware components, such as FRUs. It would also be highly beneficial not to have multiple controllers in a computer system having duplicative roles for managing and accessing devices on the computer systems.

Accordingly, it would be advantageous to provide a computer system (e.g., a CPCI computer system) that can reliably support I2C drivers using an IPMI controller and/or without having duplicative and multiple controllers on the computer system. It addition, it would be desirable during upgrading of the computer system that the upgraded computer system has a single controller (e.g., an IPMI controller) to save the cost of not having an extra and duplicative controller (e.g., an I2C controller) but can still use existing FRUs having I2C slave drivers. That is, it would be advantageous to preserve proper compatibility for the I2C slave drivers to minimize the engineering effort required to move over from an existing computer system to an IPMI controller computer system.

SUMMARY OF THE INVENTION

The present invention provides a system and method that allows various Inter Integrated Circuit (I2C) slave devices having I2C slave drivers to be controlled by an Intelligent Platform Management Interface (IPMI) controller (or another micro-controller that is not a dedicated I2C controller) without any modification of the I2C slavers drivers on these I2C slave devices. In one embodiment, a translation module is provided by the present system and method to an IPMI micro-controller that can represent I2C interface to I2C device drivers.

In a more specific embodiment, a compact peripheral component interconnect (CPCI) system includes a chassis and a circuit board forming a backplane within the chassis. The circuit board is coupled to a node card. The node card includes a central processing unit (CPU) for providing a computational service (e.g., management and access of devices) on the CPCI system. The circuit board is also coupled with an Intelligent Platform Management Interface (IPMI) micro-controller and a field replaceable unit (FRU). The IPMI micro-controller communicates with the CPU via an IPMI. The FRU communicated with the IPMI micro-controller via an Inter Integrated Circuit (I2C) interface. The IPMI micro-controller can manage and access the FRU via the IPMI micro-controller. In addition, the IPMI micro-controller off-loads management and access functions of the FRU from the CPU to the IPMI micro-controller.

In another embodiment of the present invention, a CPCI system includes a node card coupled with a circuit board. The node code has a CPU for providing a computational service on the system. A controller is coupled with the circuit board and communicating with the CPU via a first communication interface for communicating with a first type of protocol. A second node card is also coupled with the circuit board and communicates with the controller via the first communication interface and the first type of protocol. An FRU is also coupled with the controller and communicates with the controller via a second communication interface for communicating with a second type of protocol. The controller includes a translation module that translates information to and from the first and second type of protocols via the first and second communication interfaces. The controller also off-loads management and access functions of the second node card and the FRU from the CPU to the controller. In addition, the CPU manages and accesses the FRU via the controller.

A more complete understanding of the system and method for exporting I2C controller interfaces for I2C slave devices using IPMI micro-controller will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

The drawings illustrate the design and utility of preferred embodiments of the invention. The components in the drawings are not necessarily to scale, emphasis instead being placed upon illustrating the principles underlying the embodiment. Moreover, in the drawings like reference numerals designate corresponding parts throughout the different views.

DETAILED DESCRIPTION

The present invention is directed to methods and/or systems that are adapted to manage and access devices on computer systems, such as CPCI computer systems. Particularly, in one embodiment of the present invention, a system and method is provided that allows an Intelligent Platform Management Interface (IPMI) controller (or another controller that is not a dedicated I2C controller) to control (or manage and access) various Inter Integrated Circuit (I2C) slave devices having I2C slave drivers. The IPMI controller of the present invention controls the various I2C slave devices without any modification of the I2C slavers drivers on these I2C slave devices and/or without a dedicated I2C controller.

The system and method of the present invention can be used to address the compatibility issues of moving over from a computer platform or system where I2C slave devices were controlled by a dedicated I2C controller (or I2C master or an external I2C controller) to a platform where IPMI micro-controller is used to control these I2C slave devices.

Specifically, an embodiment of the invention provides an extended IPMI micro-controller to simulate an I2C controller driver. That is, a typical IPMI micro-controller has a firmware running on it that off-loads some control processing from a host CPU to the IPMI micro-controller. For example, the IPMI micro-controller performs dynamic discovery and management of a plurality of Field Replaceable Unit (FRU) devices on the computer system. The IPMI micro-controller also provides an interface to the primary host CPU (the primary CPU where the applications will be running, e.g. Intel Xeon, Itanium, Sun SPARC etc.) to read and write an I2C slave device. In the context of the embodiment of the present invention, I2C slave devices are very small Application Specific Integrated Circuits (ASICs) that do not contain a lot of processing capabilities (intelligence). That is, the I2C slave devices contain just about enough processing intelligence to provide interfacing functions with an external I2C bus. For example, a temperature sensor I2C slave device contains the temperature of a device where it is attached, and returns this value when a request is made over the I2C bus interface.

Ordinarily, IPMI micro-controller provides a request/response interface to the host CPU. There are many commands that the host CPU can send to the IPMI micro-controller (or controller), and in turn the IPMI controller executes that command, and returns the result/response to the host CPU. One such command is a write/read I2C device (which is command 0x52 in IPMI specification). The system and method of the current invention present a direct I2C controller interface to the operating system by translating I2C write and read requests from slave I2C drivers to a request of the IPMI controller and vice versa. Thus, I2C slave drivers, which were written according to the I2C services interface, still function as if there is a dedicated I2C controller having an I2C master driver underlying the system, while in actuality only a simulated driver on the IPMI exits, but providing the same level of service as a genuine dedicated I2C controller.

Embodiments of the present invention can be implemented with a plurality of node cards that are plugged into a CPCI system (e.g., a Netra® ct system). The node cards are managed from a host CPU card on at least one node card and an IPMI micro-controller coupled with the host CPU. The primary channel of communication between the host CPU on the one node card and the other devices on the node card is through an IPMI bus link via the IPMI micro-controller. The same link is also used for inter-card (or inter-blade) interactions.

Figure 1:
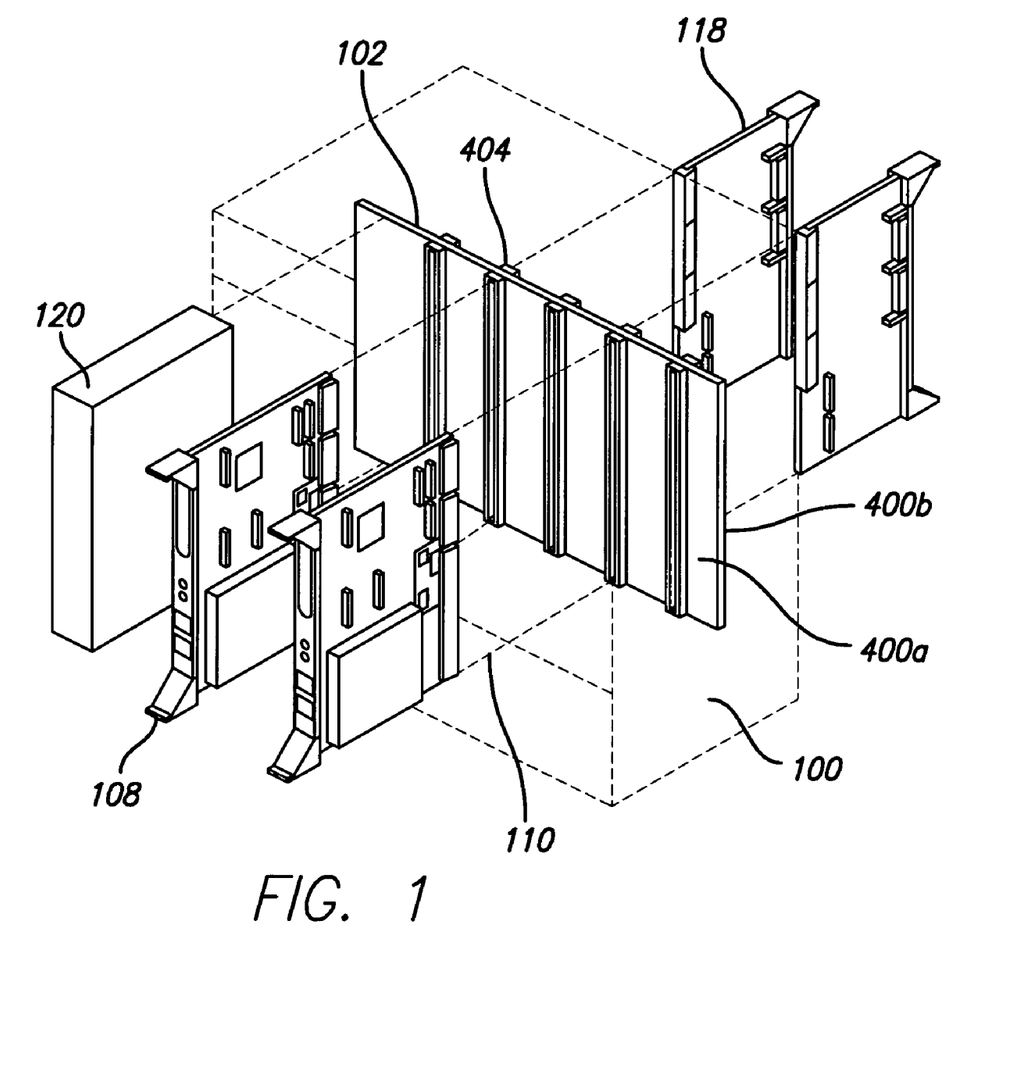
FIG. 1 is an exploded perspective view of a CPCI chassis system according to an embodiment of the invention.

Referring to FIG. 1, there is shown an exploded perspective view of a CPCI chassis system as envisioned in an embodiment of the present invention. The chassis system 100 includes a CPCI circuit board referred to in the conventional CPCI system as a passive backplane (or centerplane) 102 since the circuit board is located at the back of the chassis 100 and front cards (e.g., motherboards) are inserted from the front of the chassis 100. The front side 400a of the backplane 102 has slots provided with connectors 404. A corresponding transition card 118 is coupled to the front card 108 via backplane 102. The backplane 102 contains corresponding slots and connectors (not shown) on its backside 400b to mate with transition card 118. In the chassis system 100 that is shown, a front card 108 may be inserted into appropriate slots and mated with the connectors 404. For proper insertion of the front card 108 into the slot, card guides 110 are provided. This CPCI chassis system 100 provides front removable front cards (e.g., motherboards) and unobstructed cooling across the entire set of front cards. The backplane 102 is also connected to a power supply 120 that supplies power to the CPCI system.

Figure 2:
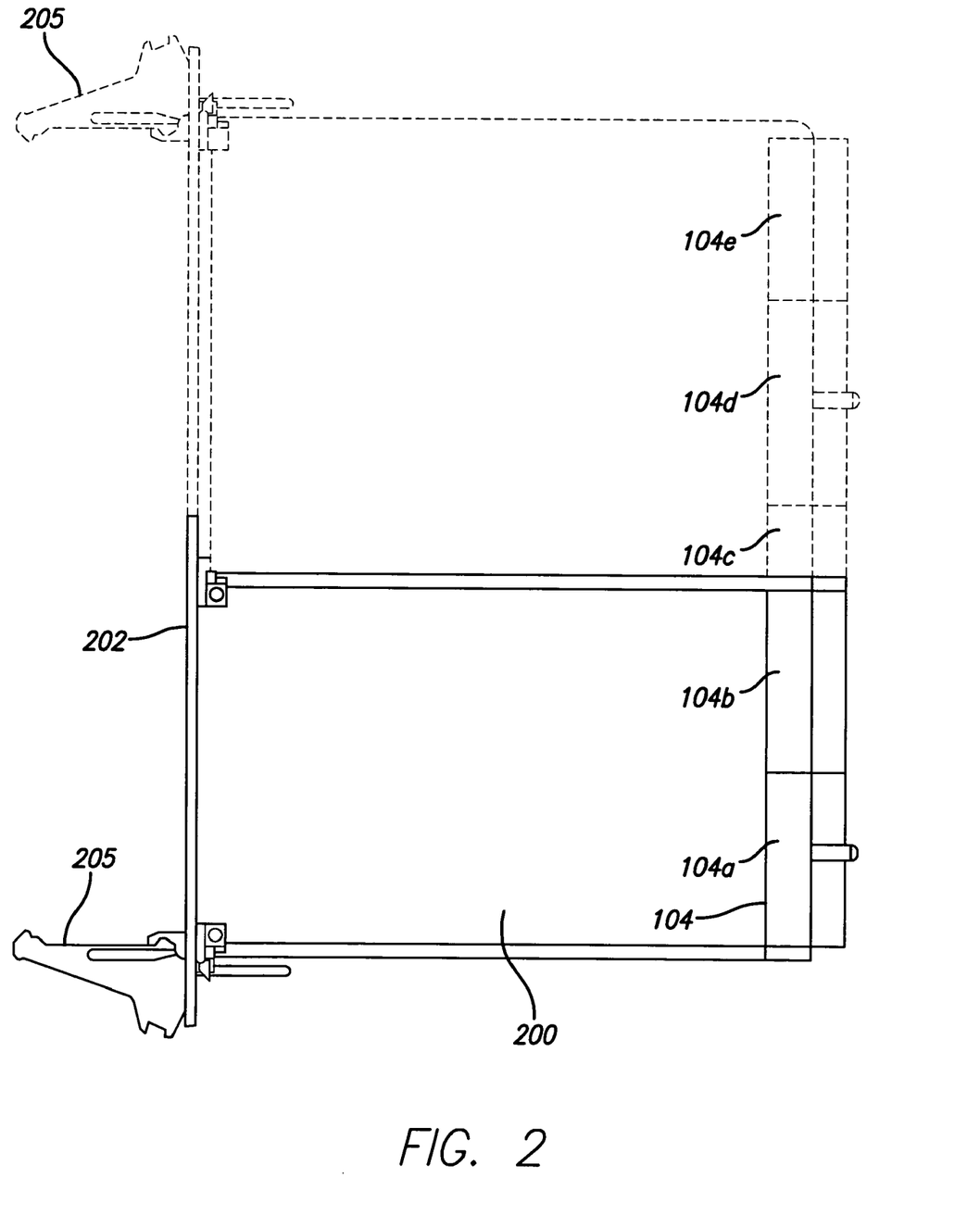
FIG. 2 shows the form factors that are defined for the CPCI node card.

Referring to FIG. 2, there are shown the form factors defined for the CPCI front card (e.g., motherboard), which is based on the PICMG CPCI industry standard (e.g., the standard in the PICMG 2.0 CPCI specification). As shown in FIG. 2, the front card 200 has a front plate interface 202 and ejector/injector handles 205. The front plate interface 202 is consistent with PICMG CPCI packaging and is compliant with IEEE 1101.1 or IEEE 1101.10. The ejector/injector handles should also be compliant with IEEE 1101.1. Two ejector/injector handles 205 are used for the 6U front cards in the present invention. The connectors 104a–104e of the front card 200 are numbered starting from the bottom connector 104a, and the 6U front card size is defined, as described below.

The dimensions of the 3U form factor are approximately 160.00 mm by approximately 100.00 mm, and the dimensions of the 6U form factor are approximately 160.00 mm by approximately 233.35 mm. The 3U form factor includes two 2 mm connectors 104a–104b and is the minimum as it accommodates the full 64 bit CPCI bus. Specifically, the 104a connectors are reserved to carry the signals required to support the 32-bit PCI bus; hence no other signals may be carried in any of the pins of this connector. Optionally, the 104a connectors may have a reserved key area that can be provided with a connector "key," which may be a pluggable piece (e.g., a pluggable plastic piece) that comes in different shapes and sizes, to restrict the add-on card to mate with an appropriately keyed slot. The 104b connectors are defined to facilitate 64-bit transfers or for rear panel I/O in the 3U form factor. The 104c–104e connectors are available for 6U systems as also shown in FIG. 2. The 6U form factor includes the two connectors 104a–104b of the 3U form factor, and three additional 2 mm connectors 104c–104e. In other words, the 3U form factor includes connectors 104a–104b, and the 6U form factor includes connectors 104a–104e. The three additional connectors 104c–104e of the 6U form factor can be used for secondary buses (i.e., Signal Computing System Architecture (SCSA) or MultiVendor Integration Protocol (MVIP) telephony buses), bridges to other buses (i.e., Virtual Machine Environment (VME) or Small Computer System Interface (SCSI)), or for user specific applications. Note that the CPCI specification defines the locations for all of the connectors 104a–104e, but only the signal-pin assignments for certain connectors are defined (e.g., the CPCI bus portion 104a and 104b are defined). The remaining connectors are the subjects of additional specification efforts or can be user defined for specific applications, as described above.

Figure 3:
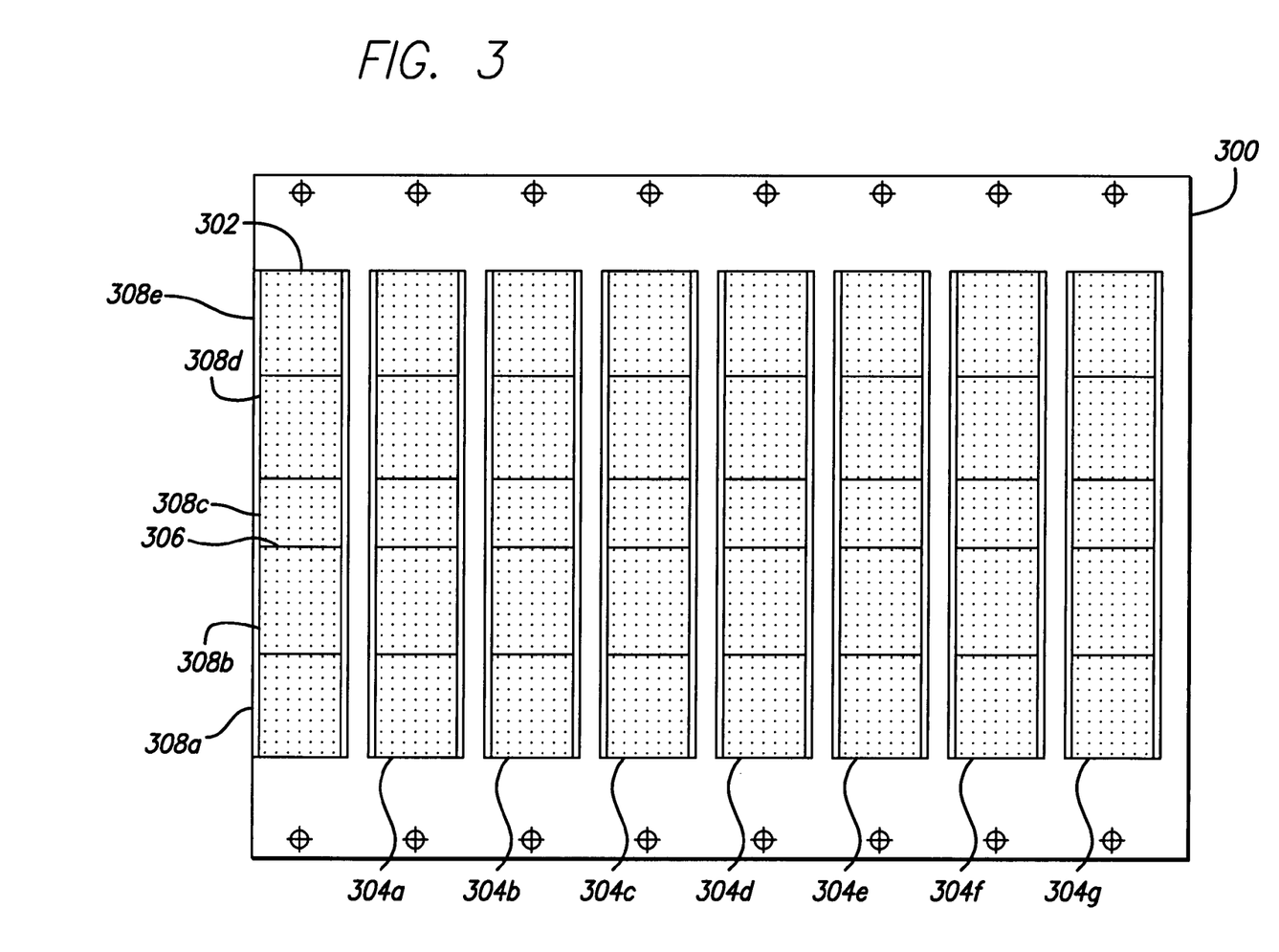
FIG. 3 is a front view of a backplane having eight slots with five connectors each.

Referring to FIG. 3, there is shown a front view of a 6U backplane having eight slots. A CPCI system includes one or more CPCI bus segments, where each bus segment typically includes up to eight CPCI card slots. Each CPCI bus segment includes at least one system slot 302 and up to seven peripheral slots 304a–304d. The CPCI front card for the system slot 302 provides arbitration, clock distribution, and reset functions for the CPCI peripheral cards on the bus segment. The peripheral slots 304a–304d may contain simple cards, intelligent slaves and/or PCI bus masters.

The connectors 308a–308e have connector-pins 306 that project in a direction perpendicular to the backplane 300, and are designed to mate with the front side "active" cards ("front cards"), and "pass-through" its relevant interconnect signals to mate with the rear side "passive" input/output (I/O) card(s) ("rear transition cards"). In other words, in the conventional CPCI system, the connector-pins 306 allow the interconnected signals to pass-through from the front cards, such as the motherboards, to the rear transition cards.

Figure 4A:
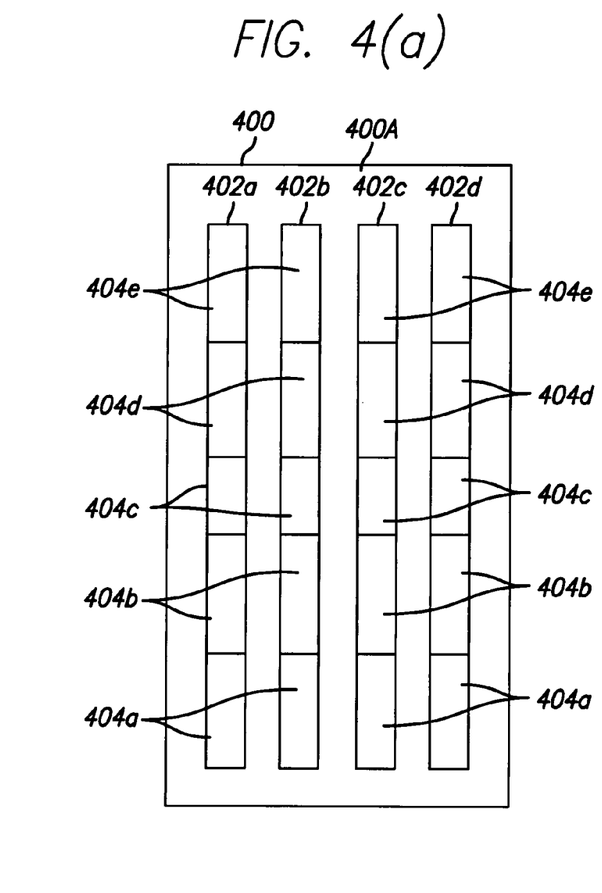
FIG. 4(a) shows a front view of another CPCI backplane.
Figure 4B:
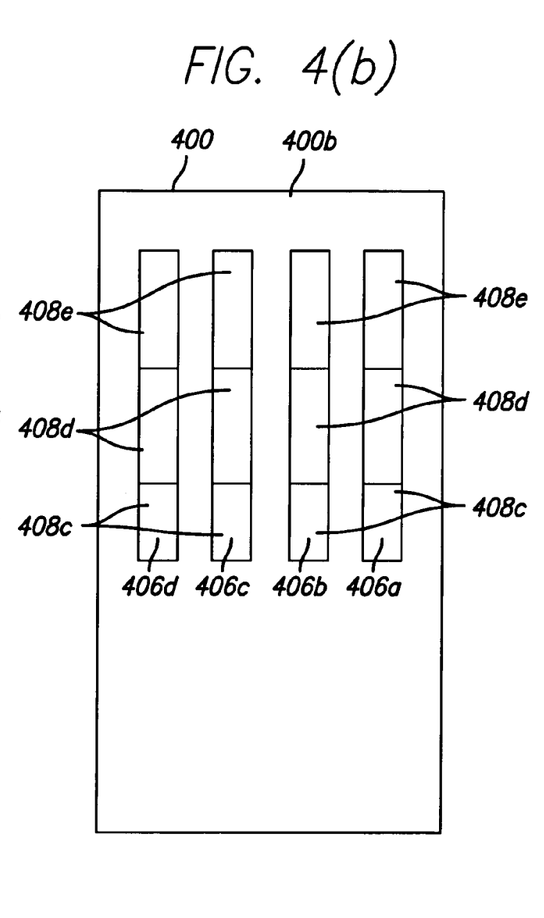
FIG. 4(b) shows a back view of the backplane of FIG. 4(a)

Referring to FIGS. 4(a) and 4(b), there are shown respectively a front and back view of a CPCI backplane in another 6U form factor embodiment. In FIG. 4(a), four slots 402a–402d are provided on the front side 400a of the backplane 400. In FIG. 4(b), four slots 406a–406d are provided on the back side 400b of the backplane 400. Note that in both FIGS. 4(a) and 4(b) four slots are shown instead of eight slots as in FIG. 3. Further, it is important to note that each of the slots 402a–402d on the front side 400a has five connectors 404a–404e while each of the slots 406a–406d on the back side 400b has three connectors 408c–408e. This is because the 404a connectors are provided for 32 bit PCI and connector keying and the 404b connectors are typically only for I/O in the 3U form factor. Thus, in the 6U form factor they do not typically have I/O connectors to their rear. Accordingly, the front cards that are inserted in the front side slots 402a–402d only transmit signals to the rear transition cards that are inserted in the back side slots 406a–406d through front side connectors 404c–404e.

Figure 5:
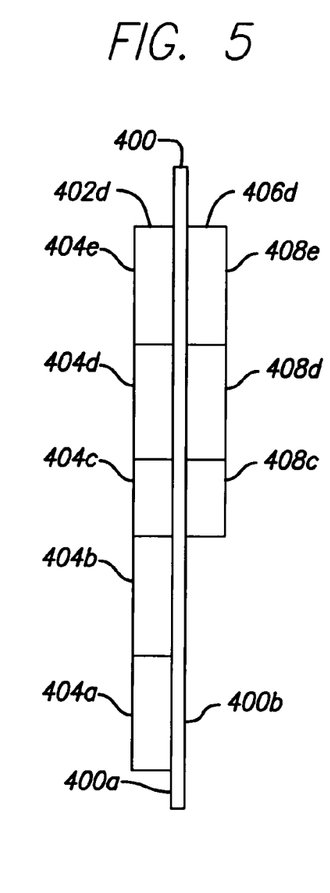
FIG. 5 shows a side view of the backplane of FIGS. 4(a) and 4(b)

Referring to FIG. 5, there is shown a side view of the backplane of FIGS. 4(a) and 4(b). As shown in FIG. 5, slot 402d on the front side 400a and slot 406d on the back side 400b are arranged to be substantially aligned so as to be back to back. Further, slot 402c on the front side 400a and slot 406c on the backside 400b are arranged to be substantially aligned, and so on. Accordingly, the front side connectors 404c–404e are arranged back-to-back with the back side connectors 408c–408e. Note that the front side connector 404a–404b does not have a corresponding back side connector. It is important to note that the system slot 402a is adapted to receive the front card having a CPU; the signals from the system slot 402a are then transmitted to corresponding connector-pins of the peripheral slots 402b–402d. Thus, the preferred CPCI system can have expanded I/O functionality by adding peripheral front cards in the peripheral slots 402b–402d.

Figure 6:
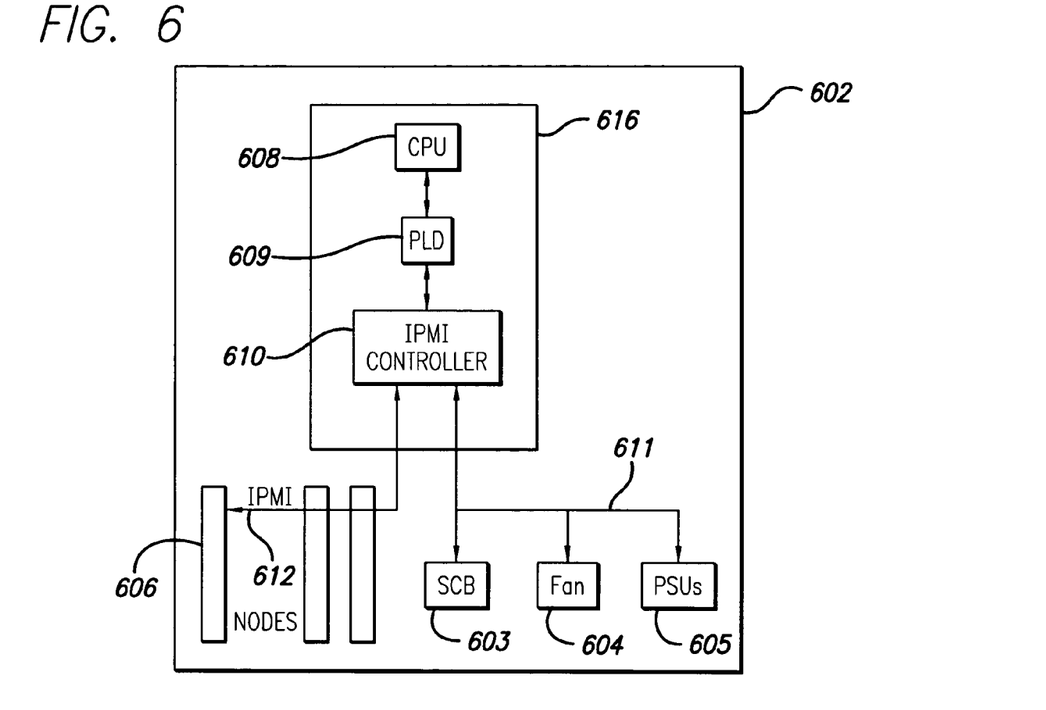
FIG. 6 shows a block diagram that illustrates a CPCI system that includes a host card and a host CPU according to an embodiment of the invention.

Referring to FIG. 6, there is shown an exemplary CPCI system 602 comprising a CPCI backplane or midplane (not shown), a plurality of node cards (or blades) 606, a host node card or master card (MC) 616, a switch card (not shown), power supplies 605, fans 604, and a system control board (SCB) 603. The MC 616 includes a central processing unit (CPU) 608 to provide the on-board intelligence for the MC 616. The CPU 608 of the MC 616 is coupled to memories (not shown) containing a firmware and/or software that runs on the MC 616, IPMI controller 610, and other devices, such as a programmable logic device (PLD) 609 for interfacing an IPMI controller 610 with the CPU 608. The SCB 603 provides the control and status of the system 602, such as monitoring the healthy status of all the power supplies 605 and the fans 604 (FRUs), powering ON and OFF the FRUs, etc. The SCB 603 is interfaced with the MC 616 via an I2C interface 611 so that the MC 616 can access and control the FRUs in the system 602. The fans 604 provide the cooling to the entire system 602. Each of the fans 604 has a fan board which provides control and status information about the fans and, like the SCB 603, are also controlled by the MC 616 through the I2C interface 611. The power supplies 605 provide the required power for the entire system 602. The MC 616 manages the power supplies 605 through the I2C 611 (e.g., the MC 616 determines the status of the power supplies 605 and can power the power supplies 605 ON and OFF). The node cards 606 are independent computing nodes and the MC (which may also be a node card) manages these node cards though the IPMI 612 (or IPMB).

In addition, the IPMI controller 610 has its own processing core unit and runs the IPMI protocol over the IPMB 612 to perform the management of the computing node cards 606. IPMI Controller 610 is also the central unit (or point) for the management of the system 602. The CPU 608 of the MC 616 can control the IPMI controller 610 and retrieve the system 602 status information by interfacing with the IPMI controller 610 via PLD 609. The IPMI controller 610 provides the MC 616 with the IPMB 612 (the IPMB then connects with the "intelligent FRUs," such as node cards and switch fabric card) and the I2C 611 (the I2C interface 611 then connects with the "other FRUs," such as fans, power supplies, and the SCB).

As previously stated, embodiments of the present invention are applicable in a Compact Peripheral Component Interconnect (CPCI) system that is adapted to manage and access I2C slave devices (or FRUs) having I2C slave drivers. More specifically, in one embodiment of the present invention, a system and method is provided to allow various I2C slave devices having I2C slave drivers to be controlled without an I2C controller. That is, the system and method uses an extended Intelligent Platform Management Interface (IPMI) controller to control these I2C slave devices without any modification of the I2C slave drivers on these devices.

As defined in the IPMI specification released from PICMG, each processing unit or CPU (of a node card or motherboard) has one management application running which communicates with IPMI micro-controller to exchange system management information. One embodiment of the present invention extends this concept to allow the IPMI micro-controller to exchange management information between a plurality of I2C slave devices and a management application running simultaneously on a CPU of a node card. Under this embodiment, each management application of the CPU may access a virtual or pseudo I2C controller running on the IPMI micro-controller and exchange information with this virtual entity. The I2C slave devices function as if they are still being controlled by an actual dedicated I2C controller (or master). That is, the virtual I2C controller of the present invention preserves proper binary compatibility for the I2C slave devices and the IPMI micro-controller.

Embodiments of the present invention can be implemented with an operating system (e.g., a UNIX® operating system or a Solaris™ operating system) that provides an I2C service framework having a hierarchal (or parent-child) relationship between an I2C master and its slave devices. The master device (e.g., the I2C controller)

implements a standard set of read/write interface commands through a service module, which the slave driver uses to perform I2C transactions. The advantage of this hierarchal relationship is that a slave driver can work with any I2C controller (or master) without recompilation of its binary codes so that the respective devices having the I2C drivers can be designed independent of one another. While there are obvious advantages in using an I2C controller, it poses problem when a dedicated I2C controller system is upgraded by a computer system having an IPMI micro-controller or without an I2C controller. The IPMI micro-controller is not a dedicated I2C master, but is a dedicated micro-controller for more intelligent processing units, such as node cards. Thus, the I2C master-slave relationship is broken—requiring all I2C slave device drivers to be re-designed based on the modified interfaces provided by the IPMI micro-controller.

Accordingly, to minimize the engineering effort required to move from a dedicated I2C controller system to an IPMI micro-controller system, an embodiment of the present invention extends an IPMI micro-controller to not only provide regular IPMI services but is also capable of controlling a set of I2C slave devices coupled to one of its I2C buses (or channels). This offloads the task of implementing I2C master write/read protocols from a host CPU and/or an I2C controller to the IPMI controller. That is, the embodiment provides standardized interface to the host CPU which can request transfer of data to and from any I2C devices coupled to a particular I2C channel via the extended IPMI micro-controller.

In one embodiment of the present invention, the extended IPMI micro-controller includes a virtual (or pseudo) I2C master device driver that translates I2C read/write requests into IPMI commands and vise versa. Thus, the IPMI micro-controller can then control the I2C slave devices as if they are IPMI slave devices and the I2C slave devices can then be controlled by the IPMI micro-controller as if it is an I2C controller.

In particular, I2C is a low cost serial bus protocol designed to be used with FRUs in a computer system (e.g., a CPCI server system). The bus is composed of two signals: a serial data (SDA) and a serial clock (SCL). Data transfers are byte oriented and the performance ranges from zero (0) to one hundred (100) Kbit/s, which limits the usage to applications which require infrequent and small accesses. Because of the cost advantages, the use of I2C devices is increasing. Some of the I2C devices already in use or soon to be in use include EEPROMs, thermal sensors, DACs (for fan speed control), and smart-card readers. The existing I2C drivers in an operating system contain substantial amounts of duplicated codes to handle communication and control of the I2C bus controller. Accordingly, in a computer system embodiment of the present invention, the duplicated codes across the I2C client drivers and platforms are first eliminated. Then, once these duplicate codes are eliminated, the embodiment of the present invention eliminates the hardware I2C bus controller and simulates the function of this I2C controller in a firmware or a software. The firmware or software can then be incorporated with an IPMI micro-controller so that the IPMI micro-controller can function as a virtual I2C controller.

Figure 7:
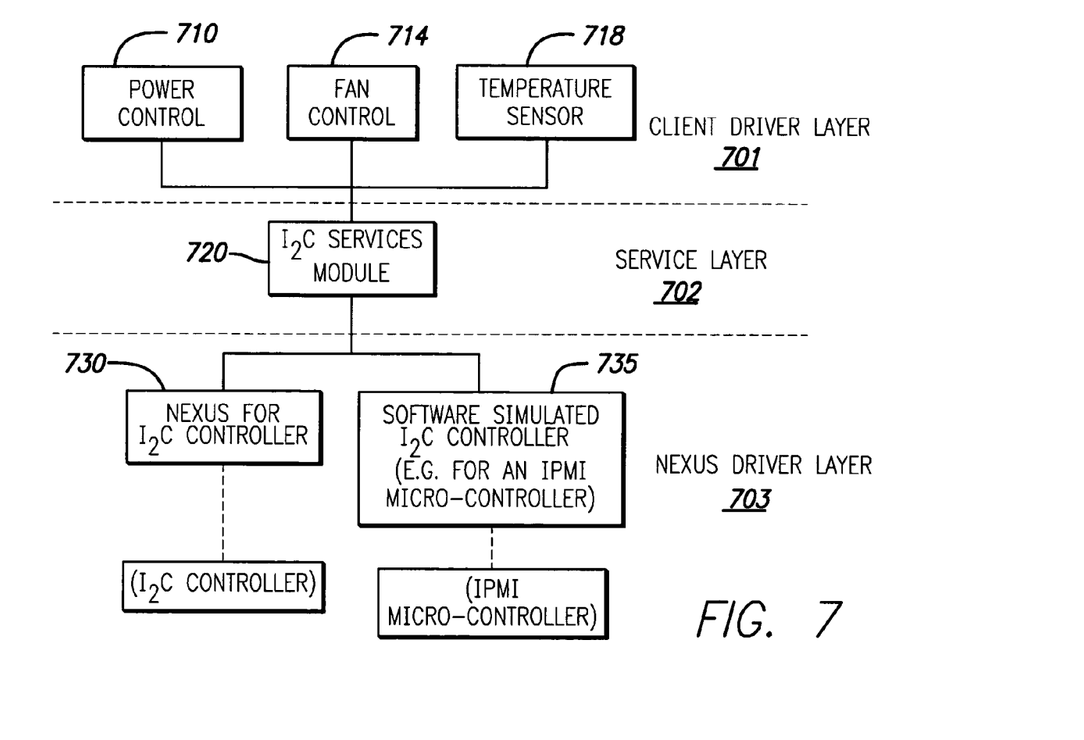
FIG. 7 shows a block diagram that illustrates an Inter Integrated Circuit (I2C) management framework according to an embodiment of the invention.

An embodiment of the present invention has an I2C management framework that has three distinct layers or interfaces. The I2C management framework is implemented with (or extended into) an IPMI micro-controller. Referring to FIG. 7, the three interfaces (or layers) of the present I2C framework include client (slave) driver layer 701, service (or hardware independent) layer 702, and nexus (master) driver layer 703. Client driver layer 701 includes power control 710, fan control 714, and temperature sensor 718. Power control 710 can comprise a device driver for controlling a power supply; fan control 714 can comprise a device driver for controlling a cooling fan; and temperature sensor 718 can comprise a device driver for sensing temperature. Nexus driver layer 703 includes nexus for I2C controller 730. Nexus for I2C controller 730 provides an interface that allows an I2C controller (or multiple I2C controllers) to be utilized. Service layer 702 includes I2C service module 720. I2C service module 720 provides a hardware independent interface for information directed to and from client driver layer 701 and nexus driver layer 703.

More specifically, I2C service module 720 allows power control 710, fan control 714, and temperature control 718 to interface with the computer system without regard to any hardware or transport issues. In one embodiment of the present invention, I2C service module 720 includes a set of common I2C services that are available to power control 710, fan control 714, and temperature sensor 718. The set of common I2C services includes services that can call (or interface with) nexus for I2C controller 730 and/or software simulated I2C controller 735 in the nexus driver layer 703 to facilitate hardware control. It should be appreciated to those skilled in the art that the service layer 702 and the nexus driver layer 703 are separate entities having proper functional interfaces.

As discussed above, nexus driver layer 703 of the present embodiment also includes software simulated I2C controller 735. Software simulated I2C controller 735 can be used to perform I2C transactions to and from the I2C slave devices (e.g., a fan and/or a power supply) for an IPMI micro-controller. Specifically, software simulated I2C controller 735 is provided for the IPMI micro-controller and behaves like a virtual (or pseudo) I2C controller driver to provide all the interfaces expected from an I2C controller and an I2C controller driver. That is, all slave I2C drivers (i.e., controls and sensors 710, 714, and 718) still behave or function as if they were the children of (or being controlled by) an I2C controller with an actual I2C master driver, while in actuality the hardware architecture has been changed (e.g., the physical I2C controller can be eliminated and/or the IPMI controller has been added). For example, software simulated I2C controller 735 can be used to translate I2C read/write requests and/or commands from the slave I2C drivers (e.g., power control 710, fan control 714, and/or temperature sensor 718) into IPMI requests and/or commands for the IPMI micro-controller. Alternatively or in addition, software simulated I2C controller 735 can be used to translate IPMI requests and/or commands from the IPMI micro-controller into I2C read/write requests and/or commands for the slave I2C drivers. Regardless, in the present invention's I2C and/or IPMI service framework (i.e., the hierarchal (or parent-child) relationship between a master and its slave devices), the I2C slave devices of the present invention are still represented as children of an I2C master controller, but the IPMI micro-controller of the present invention is portrayed as an I2C master directly controlling its slaves (as if these I2C slave devices are IPMI slave devices). Accordingly, all slave I2C device drivers written for the I2C slave devices could be re-used on the new architecture of the present invention without any re-compilation, once a nexus driver acting as an I2C master device driver has been extended for an IPMI micro-controller.

The following is a list of I2C interfaces along with the corresponding commitment levels and a brief comment on their usage in accordance with an embodiment of the present invention. The interfaces may each be a Consolidation Private interface. That is, interfaces may need to be installed on a single installation medium to avoid inter-product version incompatibility for their Consolidation Private interfaces.

I2C Interfaces in Service Layer 702

Services provided by I2C service module 720 to the client (slave) drivers (or controls 710, 714, 718) are passed through via the I2C service interfaces. I2C service module 720 provides bus transfer services, as well as a generic set of convenience interfaces which are useful for memory allocation and de-allocation. For example, the I2C services interfaces may comprise a first interface to handle all read and write I2C bus transactions. The drivers use one of the I2C memory allocating routines to use this first interface and the read and write buffer. There are three types of read and write transfers that may be passed through or performed on this first interface: a write-only transfer, a read-only transfer, and a write followed by a read transfer. The write followed by a read transfer is useful for devices where an application running on a CPU needs to first write out the device register (to access it) followed by a read to transfer the register value.

The I2C service interfaces may also comprise a second interface to handle any transfers of slave devices, a third interface to handle any detachments of slave devices, a fourth interface to handle and detect any partial data transfers to the slave devices, a fifth interface to handle any data buffering functions, etc.

In one embodiment of the present invention, the I2C services interfaces are:

| interface | commitment | comments |
|---|---|---|
| i2c_client_register( ) | Cons. Private | client drv registration with I2C services |
| i2c_client_unregister( ) | Cons. Private | client drv un-reg. with I2C services |
| i2c_transfer( ) | Cons. Private | read or write data to the I2C device |
| i2c_transfer_alloc( ) | Cons. Private | allocates i2c_transfer structure |
| i2c_transfer_free( ) | Cons. Private | free i2c_transfer structure |
| i2c_transfer_t | Cons. Private | xfer struct passed to i2c_transfer( ) |
| i2c_client_hdl_t | Cons. Private | handle used in client drivers |
| I2C_XFER_REV | Cons. Private | version passed in i2c_transfer_t |
| I2C_SUCCESS | Cons. Private | #define for i2c interface return values |
| I2C_FAILURE | | |
| I2C_INCOMPLETE | | |
| I2C_NOSLEEP | Cons. Private | #define for i2c_transfer_alloc( ) flags |
| I2C_SLEEP | | |

I2C Nexus Driver Interfaces in Nexus Driver Layer 703

Services provided by I2C service module 720 to the nexus driver layer 703 are passed through via the I2C nexus driver interfaces. For example, the I2C nexus driver interfaces may comprise a first interface to register nexus client availability to I2C services.

The I2C nexus driver interfaces may also comprise a second interface to inform I2C services that the I2C nexus driver is ready to accept I2C bus transactions, a third interface to inform I2C services that the nexus driver is no longer accepting I2C bus transactions, etc.

In one embodiment of the present invention, these interfaces are:

| interface | commitment | comments |
|---|---|---|
| i2c_nexus_register( ) | Cons. Private | nexus drv register with I2C services |
| i2c_nexus_unregister( ) | Cons. Private | nexus drv unregister with i2c services |
| i2c_nexus_reg_t | Cons. Private | nexus registration structure |
| I2C_NEXUS_REV | Cons. Private | version passed in i2c_nexus_reg_t |

Management of I2C Devices Via an IPMI Controller

In essence, embodiments of the present invention provide a translation module that can represent an I2C interface to I2C device drivers for an IPMI controller.

Figure 8:
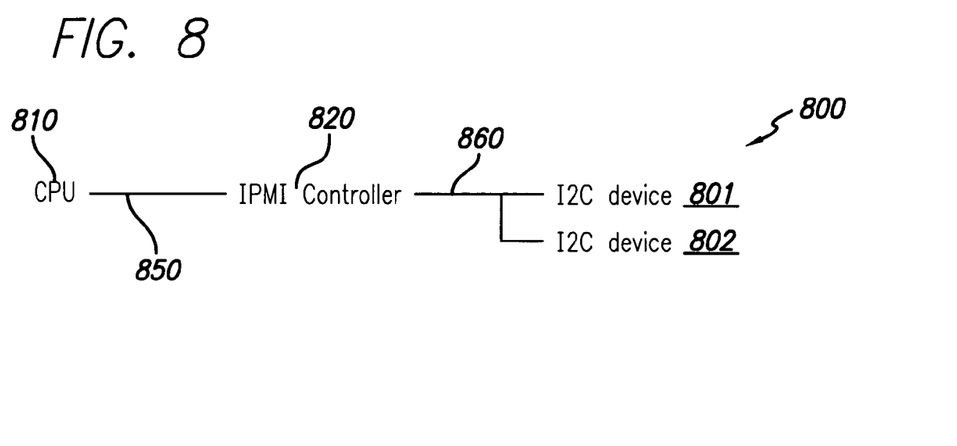
FIG. 8 shows a block diagram that illustrates an exemplary computer system having an Intelligent Platform Management Interface (IPMI) micro-controller according to an embodiment of the invention.

Referring now to FIG. 8, the present invention can provide a CPCI computer system 800 for connecting I2C devices 801 and 802 directly to the IPMI controller 820 via an I2C interface 860. A node card (not shown) of the system 800 comprises a CPU 810. The CPU 810 is coupled to the IPMI controller 820 via an IPMI 850. The IPMI controller 820 has an I2C controller (or a pseudo I2C controller) embedded in the IPMI controller 820. The I2C controller in the IPMI controller 820 is for controlling the I2C devices 801 and 802 via the I2C interface 860. It should be appreciated to those skilled in the art that this embodiment eliminates the need for an external and/or a dedicated I2C controller. In addition, it should be appreciated that the present embodiment can off-load certain duties for managing the I2C devices 801 and 802 from the CPU 810 to the IPMI controller 820.

Figure 9:
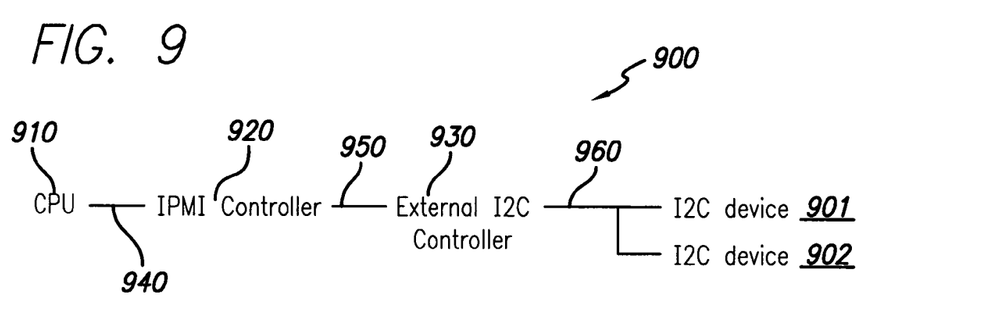
FIG. 9 shows a block diagram that illustrates another exemplary computer system having an IPMI micro-controller according to an embodiment of the invention.

Referring now to FIG. 9, the present invention can also provide for a computer system embodiment 900 in which I2C devices 901 and 902 are coupled to an external I2C controller 930 via an I2C interface 960. The external I2C controller 930 is located outside of a node card (not shown) having a CPU 910 and an IPMI controller 920. The IPMI controller 920 is coupled with the CPU 910 via an IPMI 940 and the external I2C controller 930 via an I2C interface 950. It should be appreciated that the IPMI controller 920 can be used to control and manage I2C devices 901 and 902 in this embodiment and that the CPU 910 is coupled with the external I2C controller 930 only via the IPMI controller 920.

Figure 10:
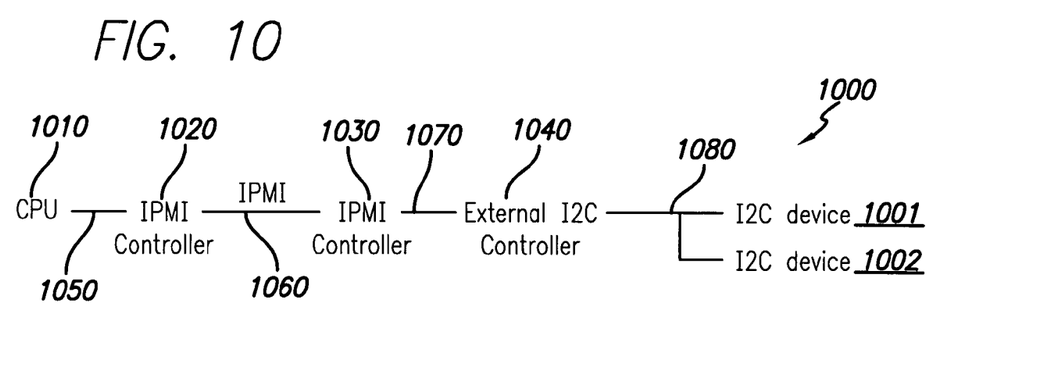
FIG. 10 shows a block diagram that illustrates a further exemplary computer system having an IPMI micro-controller according to an embodiment of the invention.

Referring now to FIG. 10, the present invention can provide for another computer system embodiment 1000 in which I2C devices 1001 and 1002 are coupled to an external I2C controller 1040 via an I2C interface 1080. The external I2C controller 1040 is coupled to a chain of IPMI controllers (e.g., a first IPMI controller 1030 in a first node code and a second IPMI controller 1020 in a second node card). Specifically, the external I2C controller is coupled with an IPMI controller 1030 via an I2C interface 1070. The IPMI controller 1030 is coupled with an IPMI controller 1020 via an IPMI 1060 and the IPMI controller 1020 is coupled with a CPU 1010 via an IPMI 1050. In the embodiment shown in FIG. 10, the I2C devices, after connecting with a chain of IPMI controllers, is coupled with the CPU 1010. In one embodiment, the CPU 1010 is located inside the second node card (not shown) of the computer system 1000. It should be appreciated that the present embodiment can off-load certain duties for managing the I2C devices 1001 and 1002 from the CPU 1010 to the IPMI controller 1020 and/or IPMI controller 1030.

In general according to the foregoing, it should be apparent to those skilled in the art that the translation module or software simulated I2C controller of the present invention can represent I2C interface to I2C device drivers to each of the embodiments shown in FIGS. 8, 9, and 10 (or represent interface that is not an IPMI to device drivers that are not IPMI device drivers). Specially, a translation module of the present invention can represent an interface for an IPMI controller (or another controller that is not a dedicated I2C controller) to I2C device drivers located in one or more I2C devices and/or I2C controllers. In addition, it should be appreciated that the embodiments shown in FIGS. 8, 9, and 10 are provided as examples of the present invention by which the invention is not limited.

Moreover, embodiments of the translation module may be implemented by a computer firmware and/or computer software in the form of computer-readable program code executed in a general purpose computing environment; in the form of bytecode class files executable within a platform-independent run-time environment running in such an environment; in the form of bytecodes running on a processor (or devices enabled to process bytecodes) existing in a distributed environment (e.g., one or more processors on a network); as microprogrammed bit-slice hardware; as digital signal processors; or as hard-wired control logic. In addition, the computer and circuit system described above are for purposes of example only. An embodiment of the invention may be implemented in any type of computer and circuit system or programming or processing environment.

Having thus described embodiments of the present invention, it should be apparent to those skilled in the art that certain advantages of the described system have been achieved. It should also be appreciated that various modifications, adaptations, and alternative embodiments thereof may be made within the scope and spirit of the present invention. For example, a system comprising CPCI system having I2C and IPMI devices has been illustrated, but it should be apparent that the inventive concepts described above would be equally applicable to other types of card arrangements, management controllers, protocols, buses, motherboards, and computer systems. The invention is further defined by the following examples and the appended claims.

EXAMPLES

For a simple NVRAM driver and according to one operation embodiment of the present invention, the following pseudo function code example illustrates an I2C interface usage:

```
/*ARGSUSED*/
static int
nvram_read(dev_t dev, struct uio *uiop, cred_t *cred_p)
{
    return (nvram_io(dev, uiop, B_READ));
}
/*ARGSUSED*/
static int
nvram_write(dev_t dev, struct uio *uiop, cred_t *cred_p)
{
    return (nvram_io(dev, uiop, B_WRITE));
}
static int
nvram_io(dev_t dev, struct uio *uiop, int rw)
{
    struct nvramunit *unitp;
    int  instance = getminor(dev);
    int  nvram_addr;
    int  bytes_to_rw;
    int  err = 0;
    int  current_xfer_len;
    i2c_transfer_t *i2ctp;
    if (instance < 0) {
        return (ENXIO);
    }
    unitp = (struct nvramunit *)
        ddi_get_soft_state(nvramsoft_statep, instance);
    if (unitp == NULL) {
        return (ENXIO);
    }
    if (uiop->uio_offset >= unitp->nvram_size) {
        /*
         * Exceeded nvram size.
         */
```

-continued
```
            if (rw == B_WRITE)_{
                return (ENOSPC);
            }
            return (0);
        }
        nvram_addr = uiop->uio_offset;
        bytes_to_rw = min(uiop->uio_resid,
            unitp->nvram_size - uiop->uio_offset);
        /*
         * We use a mutex because we don't want a read transaction to start
         * until after 20 ms delay if last operation was a write.
         */
        mutex_enter(&unitp->umutex);
        while (bytes_to_rw) {
            current_xfer_len = min(bytes_to_rw,
                    (NVRAM_PAGESIZE -
                    (nvram_addr & NVRAM_PAGEMASK)));
            if (rw == B_WRITE) {
                (void) i2c_transfer_alloc(&i2ctp, 2 + current_xfer_len,
                        0, I2C_SLEEP);
                /*
                 * prefix the write buffer with two bytes representing
                 * the address we wish to write to.
                 */
                i2ctp->i2c_version = I2C_XFER_REV;
                i2ctp->i2c_wbuf[0] = (nvram_addr >> 8);
                i2ctp->i2c_wbuf[1] = (uchar_t)nvram_addr;
                i2ctp->i2c_flags = I2C_WR;
                if ((err = uiomove(&i2ctp->i2c_wbuf[2],
                    current_xfer_len,
                    UIO_WRITE,
                    uiop)) != 0) {
                    break;
                }
                if ((err = i2c_transfer(unitp->hdl, i2ctp)) !=
                    I2C_SUCCESS) {
                    i2c_transfer_free(i2ctp);
                    break;
                }
                i2c_transfer_free(i2ctp);
                /*
                 * 20 ms(20000 Microsec) delay is required before we can
                 * initiate another write cycle.
                 */
                delay(drv_usectohz(20000));
            } else {
                /*
                 * NVRAM read
                 */
                (void) i2c_transfer_alloc(&i2ctp, 2,
                        current_xfer_len,
                        I2C_SLEEP);
                /*
                 * Write out the address that we wish to read back
                 * as the first two bytes of the write buffer. We
                 * need to use I2C_WR_RD for this.
                 */
                i2ctp->i2c_wbuf[0] = (nvram_addr >> 8);
                i2ctp->i2c_wbuf[1] = (uchar_t)nvram_addr;
                i2ctp->i2c_flags = I2C_WR_RD;
                if ((err = i2c_transfer(unitp->hdl, i2ctp)) !=
                    I2C_SUCCESS) {
                    i2c_transfer_free(i2ctp);
                    break;
                }
                /* on successful completion, the data is in rbuf */
                if ((err = uiomove(i2ctp->i2c_rbuf,
                    current_xfer_len,
                    UIO_READ,
                    uiop)) != 0) {
                    break;
                }
                i2c_transfer_free(i2ctp);
            }
            bytes_to_rw -= current_xfer_len;
            nvram_addr += current_xfer_len;
```

-continued
```
        }
        mutex_exit(&unitp->umutex);
        return (err);
    }
```

What is claimed:

1. A compact peripheral component interconnect (CPCI) system, comprising
a chassis;
a circuit board forming a backplane within said chassis;
a node card coupled with said circuit board and having a central processing unit (CPU) for providing a computational service on said system, said computational service including management and access of said system;
an Intelligent Platform Management Interface (IPMI);
an IPMI micro-controller coupled with said circuit board and communicating with said CPU via said IPMI;
an Inter Integrated Circuit (I2C) interface;
a field replaceable unit (FRU) coupled with said IPMI micro-controller and communicating with said IPMI micro-controller via said I2C interface;
wherein said IPMI micro-controller off-loads a plurality of management and access functions of said FRU from said CPU to said IPMI micro-controller; and
wherein said CPU can manage and access said FRU via said IPMI micro-controller.

2. The CPCI system of claim 1, wherein said IPMI micro-controller comprises a translation module for translating information to and from said IPMI and said I2C interface.

3. The CPCI system of claim 1, further comprising a second node card coupled with said circuit board and communicating with said IPMI micro-controller via said IPMI.

4. The CPCI system of claim 3, wherein said IPMI micro-controller off-loads a plurality of management and access functions of said second node card from said CPU to said IPMI micro-controller via said IPMI.

5. The CPCI system of claim 1, wherein said IPMI micro-controller manages and accesses said FRU via said I2C interface and wherein said CPU manages and accesses said FRU via said IPMI.

6. The CPCI system of claim 1, wherein said FRU comprises an I2C slave driver and wherein said IPMI micro-controller provides an I2C master driver for said I2C slave driver.

7. The CPCI system of claim 6, wherein said CPU can manage and access said FRU via said I2C interface without a dedicated external I2C controller.

8. The CPCI system of claim 1, wherein said IPMI micro-controller provides an I2C read command and an I2C write command for managing and access said FRU.

9. A compact peripheral component interconnect (CPCI) system, comprising:
a chassis;
a circuit board forming a backplane within said chassis;
a node card coupled with said circuit board and having a central processing unit (CPU) for providing a computational service on said system, said computational service including management and access of said system;
a first communication interface for communicating with a first type of protocol;

a controller coupled with said circuit board and communicating with said CPU via said first communication interface;

a second node card coupled with said circuit board and communicating with said controller via said first communication interface and said first type of protocol;

a second communication interface for communicating with a second type of protocol;

a field replaceable unit (FRU) coupled with said controller and communicating with said controller via said second communication interface and said second type of protocol;

wherein said controller comprises a translation module for translating information to and from said first and second type of protocols via said first and second communication interfaces;

wherein said controller off-loads a plurality of management and access functions of said second node card from said CPU to said controller;

wherein said controller off-loads a plurality of management and access functions of said FRU from said CPU to said controller; and wherein said CPU can manage and access said FRU via said controller.

10. The CPCI system of claim 9, wherein said controller comprises a first type of master driver for managing and accessing devices having a first type of slave driver via said first type of protocol and wherein said second node code comprises said first type of slave driver.

11. The CPCI system of claim 10, wherein said FRU comprises a second type slave driver for managing and accessing by a second type of master driver via said second type of protocol.

12. The CPCI system of claim 11, wherein said translation module translates information from said second type of slaver driver via said second type of protocol into information that can be used by said first type of master driver.

13. The CPCI system of claim 11, wherein said translation module translates information from said first type of master driver via said first type of protocol into information that can be used by said second type of slave driver.

14. The CPCI system of claim 9, wherein said FRU comprising one of a fan unit, a system control board unit, a memory unit, and a power supply unit.

15. The CPCI system of claim 9, wherein said controller comprises an Intelligent Platform Management Interface (IPMI) controller.

16. The CPCI system of claim 15, wherein said second type of protocol comprises an Inter Integrated Circuit (I2C) protocol.

17. The CPCI system of claim 16, wherein said IPMI controller can be directly connected with said FRU.

18. The CPCI system of claim 16, wherein said IPMI controller can be connected with said FRU via an external I2C controller having said second type of master driver.

19. The CPCI system of claim 18, wherein said translation module translates information from said second type of master driver via said second type of protocol into information that can be used by said IPMI controller.

20. The CPCI system of claim 16, wherein said IPMI controller is connected with said CPU via a plurality of other IPMI controllers.

21. The CPCI system of claim 15, wherein said translation module is located within said IPMI controller and comprises an Inter Integrated Circuit (I2C) services module.

22. The CPCI system of claim 21, wherein said I2C services module is coupled to a nexus driver having a simulated I2C controller for said IPMI controller and a simulated I2C controller for simulating information to said FRU.

23. A method for interfacing a controller with a field replaceable unit (FRU) of a compact peripheral component interconnect (CPCI) system, comprising:

managing and accessing devices on said system with a central processing unit (CPU) provided on a node card coupled to said system;

communicating a first type of protocol of said controller with said CPU via a first communication interface;

communicating said first type of protocol of said controller with a second node card via said first communication interface;

communicating a second type of protocol of said controller with a FRU via a second communication interface;

translating information to and from said first and second type of protocols via a translation module in said controller;

wherein said controller off-loads a plurality of management and access functions of said second node card from said CPU to said controller;

wherein said controller off-loads a plurality of management and access functions of said FRU from said CPU to said controller; and wherein said CPU can manage and access said FRU via said controller.

24. The method of claim 23, wherein said controller comprises an Intelligent Platform Management Interface (IPMI) controller.

25. The method of claim 24, wherein said second type of protocol comprises an Inter Integrated Circuit (I2C) protocol and wherein said IPMI controller can be directly connected with said FRU.

* * * * *